United States Patent [19]

Kannan et al.

[11] Patent Number: 5,718,824
[45] Date of Patent: Feb. 17, 1998

[54] COLLECTOR HOOD FOR SEDIMENTATION TANK

[75] Inventors: Shyam Kannan, Charlottesville, Va.; Raghavachari Kannan, Newtown Square, Pa.

[73] Assignee: Crane Co., New York, N.Y.

[21] Appl. No.: 720,805

[22] Filed: Oct. 1, 1996

[51] Int. Cl.⁶ .................................................. B01D 21/02
[52] U.S. Cl. .......................... 210/207; 210/262; 210/521; 210/532.1; 210/540
[58] Field of Search .................................... 210/207, 209, 210/262, 519, 521, 532.1, 534, 535, 538, 540

[56] References Cited

U.S. PATENT DOCUMENTS

| | | | |
|---|---|---|---|
| 1,199,099 | 9/1916 | Münzer | 210/521 |
| 2,076,529 | 4/1937 | Durdin | 210/8 |
| 2,860,786 | 11/1958 | Kittredge | 210/207 |
| 3,224,963 | 12/1965 | Talon et al. | 210/4 |
| 3,239,066 | 3/1966 | Schick | 210/521 |
| 3,393,804 | 7/1968 | Miller et al. | 210/177 |
| 3,617,544 | 11/1971 | Voss et al. | 210/20 |
| 3,706,380 | 12/1972 | Le Chances | 210/197 |
| 4,033,875 | 7/1977 | Besik | 210/207 |
| 4,038,186 | 7/1977 | Potter | 210/92 |
| 4,054,524 | 10/1977 | Svatopluk | 210/195 |
| 4,554,074 | 11/1985 | Broughton | 210/519 |
| 4,663,054 | 5/1987 | O'Connell et al. | 210/207 |
| 5,147,556 | 9/1992 | Taylor | 210/519 |
| 5,173,194 | 12/1992 | Hering, Jr. | 210/792 |
| 5,433,862 | 7/1995 | Batson | 210/521 |

FOREIGN PATENT DOCUMENTS

| | | |
|---|---|---|
| 1355616 | 7/1986 | U.S.S.R. |
| 3684 | 1/1895 | United Kingdom |

*Primary Examiner*—Christopher Upton
*Attorney, Agent, or Firm*—Woodcock Washburn Kurtz Mackiewicz & Norris LLP

[57] ABSTRACT

An improved collector hood for a sedimentation tank. The collector hood is disposed within the tank and separates the tank into an upper reaction compartment and a lower settling compartment. The collector hood has the shape of an inverted funnel including a tubular upper portion connected to an outlet in the sidewall of the upper reaction compartment and a downwardly diverging conical wall lower portion, the periphery of which engages the sidewall of the tank for separating the tank into the upper reaction compartment and the lower settling compartment. A plurality of downcomer pipes are arranged around the axis of the collector hood and depend from the downwardly diverging conical wall into the lower settling compartment. The downcomer pipes provide multiple paths for the incoming liquid mixture to pass through the downwardly diverging conical wall of the collector hood to the lower settling compartment of the tank whereby the particulate matter in the liquid mixture settles to the bottom of the tank and clear treated liquid rises to the interior of the collector hood to enter the tubular portion of the funnel and leaves the tank through the outlet in the sidewall thereof.

9 Claims, 1 Drawing Sheet

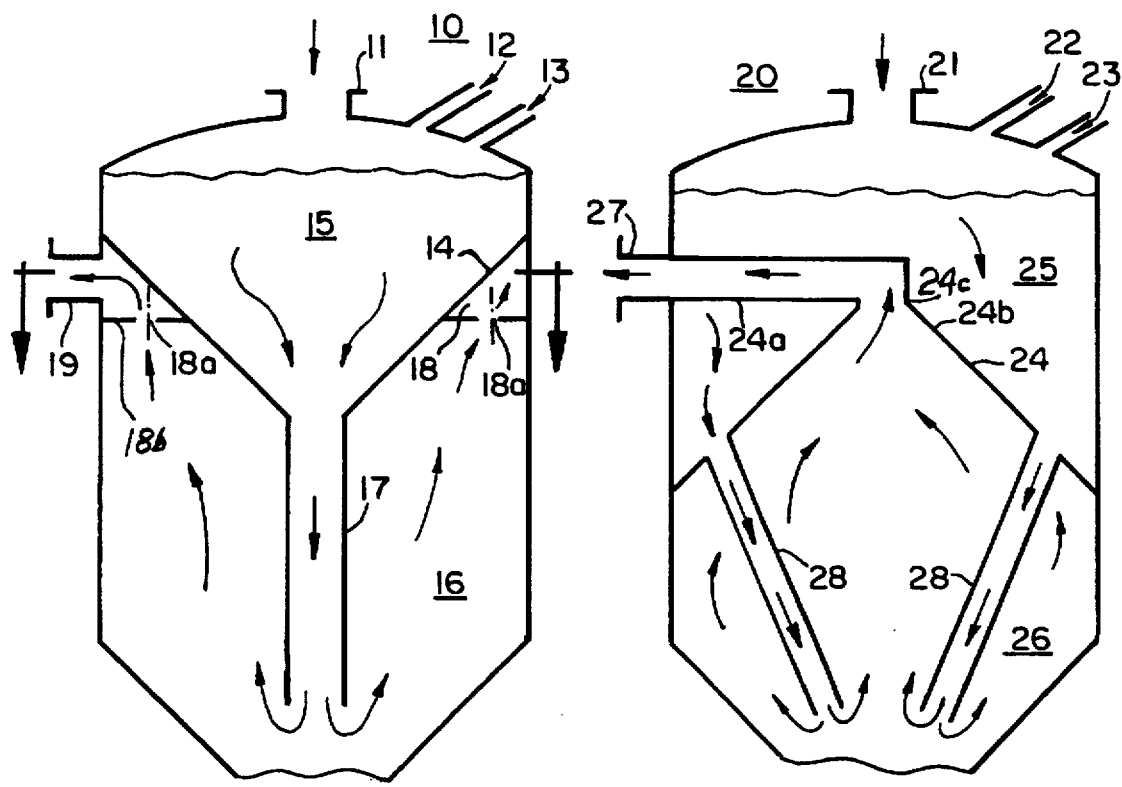
FIG. 1
PRIOR ART
FIG. 3
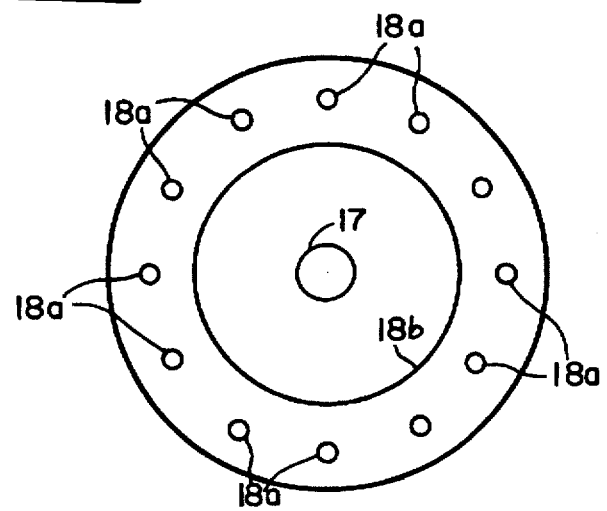
FIG. 2
PRIOR ART

COLLECTOR HOOD FOR SEDIMENTATION TANK

BACKGROUND OF THE INVENTION

This invention relates to a hot process water softener for removing precipitants from chemically treated water and particularly to an improved collector hood for a sedimentation tank.

In the field of water treatment, water is softened by heating it as by the use of steam, to a high temperature and then adding chemicals such as lime, to soften the water. This reaction takes place in a vessel commonly referred to as a sedimentation tank. This chemical reaction will produce some solid substances, such as calcium carbonate, etc., which will settle at the bottom of the tank. Fairly clear water will rise to the top of the tank where it will leave the sedimentation tank.

One type of prior art system is disclosed in U.S. Pat. No. 3,617,544. This system is sometimes referred to as the "UP FLOW" design. The system utilizes a hot process settling tank where raw water is injected at an inlet at the upper end of the tank along with steam and chemicals into an upper reaction compartment. The tank is divided into two compartments by a conical shaped partition which has the shape of a funnel and defines the upper reaction compartment and a lower settling compartment. Depending from the conical shaped partition is a conduit which forms the tubular portion of the funnel and is referred to as a downcomer pipe. The downcomer pipe communicates between the upper reaction compartment and the lower settling compartment. An annular collector ring compartment having the bottom formed by a collector ring plate having holes therethrough is provided in the upper region of the lower settling compartment. A clarified water exit opens out of the collector ring compartment above the collector ring plate. A raw water inlet, a steam inlet and a chemical inlet open into the upper reaction compartment where the water is heated by the steam and the chemicals mix with the water. Precipitants resulting from the reaction of the hardness ions in the raw water and the injected chemicals begin to form in the upper reaction compartment and flow from the upper reaction compartment down through the downcomer pipe into the lower settling compartment. The precipitants settle out in the lower portion of the settling compartment above a sludge removal outlet which is located at the bottom of the tank. As the precipitants continue to enter the lower portion of the settling compartment where they are collected, the water continues an upflow path into the upper portion of the lower settling compartment passing through the openings in the collector ring plate into the collector ring compartment and exit from the tank through the clarified water exit.

For the efficient performance of such prior art hot process settling tank, the water must rise uniformly across the cross-section of the tank. It is for this purpose that the collector ring compartment with the holes at the bottom thereof is provided. When water passes through these holes, there is a small hydraulic pressure drop, which results in uniform flow of water from below the collector ring plate into the collector ring compartment. In the absence of such holes and collector ring compartment, water will try to leave the tank at the outlet point in a phenomenon referred to as "channeling". In this phenomenon, water close to the outlet opening will tend to flow out of the tank earlier than the remainder of the water. Therefore the volume of water that is located away from the outlet opening will have a tendency to stay stagnet; this will result in water rising in a non-uniform fashion across the cross-section of the tank. This will result in poor distribution and consequently poor quality of water leaving the tank. In practice experience has shown that a small quantity of solid particles float in the water and eventually reach the collector ring plate. These solid particles have a tendency to attach themselves to the holes and plug them either partially or completely. When they plug the holes partially, water tends to flow into the collector ring compartment in a non-uniform fashion which will ultimately result in "channeling"; the very phenomenon which the collector ring compartment is supposed to prevent. When the particles plug the holes completely, this totally disrupts the process and requires that the equipment be shut down for cleaning.

It would be desirable to provide a hot process water softener for removing precipitants from chemically treated water that eliminates the need for a collector ring compartment.

SUMMARY OF THE INVENTION

It is an object of the present invention to provide a hot process water softener for removing precipitants from chemically treated water that does not require the use of a collector ring compartment.

In accordance with the present invention there is provided a hot process water softener for removing precipitants from chemically treated water having a sedimentation tank with inlet means for water, steam and precipitant producing chemicals at the upper end thereof and an outlet for clear treated water through the sidewall thereof. The apparatus includes a partition within the tank which separates the tank into an upper reaction compartment and a lower settling compartment. The partition comprises a collector hood having the shape of an inverted funnel, the collector hood including a tubular upper portion connected to the outlet in the upper reaction compartment and a downwardly diverging conical wall lower portion, the periphery of which engages the interior sidewall of the tank for separating the tank into the upper reaction compartment and the lower settling compartment. A plurality of downcomer pipes are arranged around the axis of the collector hood and depend from the downwardly diverging conical wall thereof into the lower settling compartment. The downcomer pipes provide a path for the incoming water and precipitants to pass through the downwardly diverging conical wall of the collector hood to the lower settling compartment of the tank whereby the precipitants settle to the bottom of the tank and clear treated water rises through the interior of the collector hood to enter the tubular portion of the funnel and leave the tank through the outlet in the sidewall of the tank.

BRIEF DESCRIPTION OF THE DRAWINGS

FIG. 1 is an elevational cross-sectional schematic representation of a prior art process settling tank having a collector ring compartment.

FIG. 2 is a plan view of the collector ring plate shown in FIG. 1.

FIG. 3 is an elevational cross-sectional schematic representation of a hot process sedimentation tank embodying the present invention.

DESCRIPTION OF THE PRIOR ART

A hot process settling tank of the prior art as previously described is illustrated in FIG. 1. The tank 10 is cylindrical having a conical portion at the lower end thereof and having a sledge removal outlet, not shown, located at the vertex of the tank. At the upper end of the tank there is a provision for a raw water inlet 11, an inlet for steam 12 and an inlet for precipitant producing chemicals 13. A conical shaped partition 14 which has the shape of a funnel divides the tank into an upper reaction compartment 15 and a lower settling compartment 16. A downcomer pipe 17 depends from the conical shaped partition 14 and forms the tube of the funnel shaped partition. A collector ring compartment 18 surrounds the intermediate portion of the conical shaped partition 14 beneath the clear water outlet 19 in the sidewall of the tank 10. The collector ring compartment 18 is provided with collector ring plate 18b having a plurality of holes 18a extending therethrough, as best seen in FIG. 2.

In the system illustrated in FIG. 1 the raw water, steam and chemicals are directed into the upper portion of the tank 10 where the water is softened by heating it to a high temperature and then adding chemicals, such for example as lime, to soften the water. This reaction takes place in the upper reaction compartment 15 of the sedimentation tank 10. This chemical reaction will produce some solid substances, such for example as calcium carbonate, etc., which will settle to the bottom of the tank for removal through a sludge removal outlet, now shown. The water descends through the downcomer pipe 17. The solid particles settle to the lower portion of the settling compartment 16 while the clear water rises to an annual collector ring compartment 18 defined by the collector ring plate 18b. The clear water passes through the openings or holes 18a in the collector ring plate 18b into the collector ring compartment 18 and then passes through the outlet for clear water at 19. When the water passes through the holes 18a in the collector ring plate 18b there is a small hydraulic pressure drop, which will result in uniform flow of water from below into the collector ring compartment 18. When solid particles partially plug the holes 18a the water tends to flow into the collector ring compartment 18 in a non-uniform fashion, which will ultimately result in "channeling" which is the phenomenon which the collector ring compartment is supposed to prevent. When the solid particles completely plug the holes in the plate the process is completely shut down. Removal of the hardened solid particles from the holes in the plate is a very time consuming and expensive operation which can be eliminated if it is not necessary to use the collector ring compartment.

In systems utilizing collector ring compartments, it has been found that the solid particles have a greater tendency to attach themselves to the small holes in the ring rather than to larger holes. It has also been found that it is very difficult to design an apparatus which will guarantee that distribution of solid particles is uniform in the cross-section of the tank. In view of this there is no easy way to control or predict the fashion in which the holes in the collector ring compartment will be plugged by the solids.

Referring to FIG. 3 there is illustrated a hot process water softener system embodying the present invention in which the use of a collector ring compartment has been eliminated. In FIG. 3 there is shown a sedimentation tank 20 having a raw water inlet 21, a steam inlet 22 and an inlet 23 for precipitant producing chemicals. Located within the tank 20 is a partition 24 which separates the tank into an upper reaction compartment 25 and a lower settling compartment 26. The partition 24 is in the form of a collector hood having the shape of an inverted funnel including a tubular upper portion 24a connected to a clear treated water outlet 27 in the upper reaction compartment 25 and a downwardly diverging conical wall lower portion 24b with an apex 24c.

The periphery of the downwardly diverging conical wall 24b engages the interior sidewall of the tank 20 for separating the tank 20 into the upper reaction compartment 25 and the lower settling compartment 26. It has been found that by providing the inverted cone 24b with an included angle of about 90°, the core 24b has a very efficient slope so that water and precipitants can slide down without sticking to the metal surface.

A plurality of downcomer pipes 28 are arranged around the axis of the collector hood 24 and depend from the downwardly diverging conical wall 24b thereof into the lower settling compartment. The downcomer pipes 28 provide multiple paths for the incoming water and precipitants to pass through the downwardly diverging conical wall 24b of the collector hood to the lower settling compartment 26 of the tank 20. The number of downcomer pipes is based on the best distribution of chemically treated water coming down. A minimum of four pipes is preferred, however, the number will increase as the tank diameter increases. The diameter of the downcomer pipes is selected so that the velocity of the water coming down preferably does not exceed one foot per second. The precipitants settle to the bottom of the tank 20 and the clear treated water rises through the interior of the collector hood 24 to the apex 24c to enter the tubular portion 24a of the funnel and leave the tank 10 through the outlet 27 in the sidewall of the tank. The treated water is able to rise uniformly because of the central location of the apex 24c. The size and central location of the apex 24c make this design more efficient. Various test outlets, valves, vents and flow controls (not shown) to control the raw water inlet may be attached to the tank 20. A sludge removal outlet (not shown) is normally located at the bottom of the tank for periodic heavy clean-out of the tank.

From the foregoing it will be seen that the present invention eliminates the use of a collector ring compartment which in turn eliminates the potential problems with the holes through the ring. Instead of having only one downcomer pipe, there is now provided multiple downcomer pipes which provide a plurality of paths for the water. Although the mechanical design is substantially different, there is not any change in the chemical reaction and subsequent separation process. The water is collected by a central hood and is taken out of the tank by a horizontal off-take pipe. The present invention has numerous advantages. It provides for less expensive hardware and since there is no collector ring and associated holes, there are no maintenance problems in cleaning such collector ring. Thus the downtime loss for such cleaning operation is eliminated and the solid particles being separated do not stick to the large size of the horizontal off-take.

While the present invention has been described particularly in connection with a hot process water softener system, it is to be understood that it is applicable to other systems for removing particulate matter from a liquid mixture. It also will be understood that further modifications may be made without departing from the spirit and scope of the invention as set forth in the appended claims.

What is claimed is:

1. A hot process water softener for removing precipitants from chemically treated water comprising:

a sedimentation tank having inlet means for water, steam and precipitant producing chemicals at the upper end thereof and an outlet for clear treated water through the sidewall thereof;

a partition within said tank which separates said tank into an upper reaction compartment and a lower settling compartment, said partition comprising a collector hood having the shape of an inverted funnel, said collector hood including a tubular upper portion connected to said outlet in said upper reaction compartment and a downwardly diverging conical wall lower portion, the periphery of which engages the interior sidewall of said tank for separating the tank into the upper reaction compartment and the lower settling compartment; and a plurality of downcomer pipes arranged around the axis of the collector hood and depending from the downwardly diverging conical wall thereof into the lower settling compartment, said downcomer pipes providing multiple paths for the incoming water and precipitants to pass through the downwardly diverging conical wall of the collector hood to the lower settling compartment of the tank whereby the precipitants settle to the bottom of the tank and clear treated water rises through the interior of the collector hood to enter the tubular portion of the funnel and leave the tank through the outlet in the sidewall of the tank.

2. A hot process water softener according to claim 1 wherein said downwardly diverging conical wall of said collector hood has an included angle of about 90°.

3. A hot process water softener according to claim 2 wherein at least four downcomer pipes are arranged around the axis of the collector hood and depend from the downwardly diverging conical wall thereof into the lower settling compartment.

4. In a hot process water softener system for removing precipitants from chemically treated water, such system including a sedimentation tank having inlet means for water, steam and precipitant producing chemicals at the upper end thereof and an outlet for clear treated water through the sidewall thereof, the improvement comprising:

a collector hood within said tank which separates said tank into an upper reaction compartment and a lower settling compartment, said collector hood having the shape of an inverted funnel including a tubular upper portion connected to the outlet in the sidewall in said upper reaction compartment and a downwardly diverging conical wall lower portion, the periphery of which engages the sidewall of said tank for separating said tank into said upper reaction compartment and said lower settling compartment; and a plurality of downcomer pipes arranged around the axis of said collector hood and depending from said downwardly diverging conical wall thereof into said lower settling compartment, said downcomer pipes providing multiple paths for the incoming water and precipitants to pass through said downwardly diverging conical wall of said collector hood to said lower settling compartment of said tank whereby the precipitants settle to the bottom of said tank and clear treated water rises through the interior of said collector hood to enter said tubular portion of the funnel and leave the tank through the outlet in the sidewall thereof.

5. In a hot process water softener system according to claim 4 wherein said downwardly diverging conical wall of said collector hood has an included angle of about 90°.

6. In a hot process water softener system according to claim 4 wherein at least four downcomer pipes are arranged around the axis of the collector hood and depend from the downwardly diverging conical wall thereof into the lower settling compartment.

7. In a system for removing particulate matter from a liquid mixture, such system including a sedimentation tank having inlet means for the liquid mixture at the upper end thereof and an outlet for clear treated liquid through the sidewall thereof, the improvement comprising:

a collector hood within said tank which separates said tank into an upper reaction compartment and a lower settling compartment, said collector hood having the shape of an inverted funnel including a tubular upper portion connected to the outlet in the sidewall in said upper reaction compartment and a downwardly diverging conical wall lower portion, the periphery of which engages the sidewall of said tank for separating said tank into said upper reaction compartment and said lower settling compartment; and a plurality of downcomer pipes arranged around the axis of said collector hood and depending from said downwardly diverging conical wall thereof into said lower settling compartment, said downcomer pipes providing multiple paths for the incoming liquid mixture to pass through said downwardly diverging conical wall of said collector hood to said lower settling compartment of said tank whereby the particulate matter settles to the bottom of said tank and clear treated liquid rises through the interior of said collector hood to enter said tubular portion of the funnel and leave the tank through the inlet in the sidewall thereof.

8. In a system for removing particulate matter from a liquid mixture according to claim 7 wherein said downwardly diverging conical wall of said collector hood has an included angle of about 90°.

9. In a system for removing particulate matter from a liquid mixture according to claim 8 wherein at least four downcomer pipes are arranged around the axis of said collector hood and depend from said downwardly diverging conical wall thereof into said lower settling compartment.

* * * * *